(12) United States Patent
Holleman et al.

(10) Patent No.: US 10,442,010 B2
(45) Date of Patent: Oct. 15, 2019

(54) METHODS AND SYSTEMS FOR CONTROLLING PROCESSING SEQUENCES

(71) Applicant: The Boeing Company, Chicago, IL (US)

(72) Inventors: Wesley Edward Holleman, Long Beach, CA (US); Mark Douglas Fuller, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 751 days.

(21) Appl. No.: 15/018,159

(22) Filed: Feb. 8, 2016

(65) Prior Publication Data
US 2017/0228567 A1 Aug. 10, 2017

(51) Int. Cl.
*B23B 49/00* (2006.01)

(52) U.S. Cl.
CPC .......... *B23B 49/00* (2013.01); *B23B 2215/04* (2013.01); *B23B 2270/32* (2013.01)

(58) Field of Classification Search
CPC ............................. B23B 49/00; B23B 2215/04
See application file for complete search history.

(56) References Cited

PUBLICATIONS

Kreg kma3200 shelf pin drilling jig, http://kreg.kma3200.shelf.pin.drilling.jig.rank1shop.com/, Apr. 23, 2012 (Year: 2012).*
Kreg shelf pin drilling jig KMA3200 manual, https://web.archive.org/web/20140813140951/https://www.kregtool.com/webres/Files/kregshelfpinjiginst.pdf, Aug. 13, 2014 (Year: 2014).*
Jasper tools Model-400 circular guide, Dec. 4, 2014 (Year: 2014).*
Jasper tools model-400 circular guide instructions, Dec. 10, 2014 (Year: 2014).*
Kreg Shelf Pin Jig, https://www.youtube.com/watch?v=-u4TIeQQL9U, Mar. 13, 2012.*
Hole Pro, https://holepro.wordpress.com/2011/06/08/hole-pro-x-230-a-toilet-closet-flange-fix/, Jun. 8, 2011 (Year: 2011).*

(Continued)

*Primary Examiner* — Vincent Wall
(74) *Attorney, Agent, or Firm* — Kwan & Olynick LLP

(57) ABSTRACT

Provided are methods for verifying sequences of different operations and controlling processing order in accordance with these sequences. Also provided are apparatuses for executing these methods. A method may involve determining a current configuration of an indicator positioned on a part. This operation may be performed using a tester coupled to a processing portion. If the current configuration of the indicator corresponds to this particular processing portion, then the part is processed using this processing portion. The indicator is then changed to a new configuration corresponding to another processing portion for performing the next operation in the sequence. The processing is only performed if the indicator has the current configuration corresponding to the processing portion. Otherwise, the operation is not performed, and the current configuration of the indicator not changed retained. The indicator may be a mechanical device or an electronic device.

15 Claims, 17 Drawing Sheets

(56) References Cited

PUBLICATIONS

Whinnem, Eric et al., "Development of Orbital Drilling for the Boeing 787", SAE International, Retrieved from the Internet: <http://mikaelw.weebly.com/uploads/3/9/9/5/3995176/technical_paper_boeing_787_orbitaFebruary 1, 2016l_drilling.pdf, 2008, 6pgs (Year: 2008).*

"Portable Orbital Drilling Systems", Novator, Retrieved from the Internet: < http://mvw.novator.eu/products/portable-orbital-drilling-systems_73 >, Accessed on Jan. 29, 2016, 2 pgs.

Whinnem, Eric et al., "Development of Orbital Drilling for the Boeing 787", SAE International, Retrieved from the Internet: < http://mikaelw.weebly.com/uploads/3/9/9/5/3995176/technical_paper_boeing_787_orbitaFebruary 1, 2016l_drilling.pdf >, 2008, 6 pgs.

* cited by examiner

METHODS AND SYSTEMS FOR CONTROLLING PROCESSING SEQUENCES

BACKGROUND

Different operations in multi-operational processes often must be performed according to particular sequences. These sequences can be very complex and can use similar tools making it more difficult to track the process than desired. For example, a certain combination of drilling and reaming operations may be used to create a hole having specifications for diameter, cylindricity, surface finish, burr height, acceptable carbon fiber reinforcement plastic (CFRP) delamination, and through stacks of dissimilar materials, and other characteristics. Following the specified sequence can be essential to produce parts with required characteristics. At the same time, keeping track of complex processing sequences in fast-paced production environments can be very challenging. Manual tracking may be difficult to implement because of the processing speeds and, in some cases, visual similarity of parts after different processing operations. Reliable and automated methods and apparatuses are needed for controlling sequential processing.

SUMMARY

Provided are methods for verifying sequences of different operations and controlling processing order in accordance with these sequences. Also provided are apparatuses for executing these methods. A method may involve determining a current configuration of an indicator positioned on a part. This operation may be performed using a tester coupled to a processing portion. If the current configuration of the indicator corresponds to this particular processing portion, then the part is processed using this processing portion. The indicator is then changed to a new configuration corresponding to another processing portion for performing the next operation in the sequence. The processing is only performed if the indicator has the current configuration corresponding to the processing portion. Otherwise, the operation is not performed, and the current configuration of the indicator not changed retained. The indicator may be a mechanical device or an electronic device.

In some embodiments, a method for processing a part comprises attaching an aligning portion to the part. The aligning portion is used for supporting and aligning one or more processing portions with respect to the part as further described below. The aligning portion may be attached directly to the part or using another component. For example, the aligning portion may be supported by an indexing plate. The indexing plate may be aligned with respect to and attached to the part using, for example, clamps or any other suitable attachment mechanism. In some embodiments, the indexing plate supports multiple aligning portions, which may be substantially the same or different. For example, the part may have multiple different processing locations and each of these processing locations may have a corresponding aligning portion on the indexing plate. The indexing plate ensures alignment of different aligning portions with respect to each other and simplifies the alignment of these aligning portions relative to the part.

In some embodiments, the method comprises coupling a first processing portion to the aligning portion. For example, the aligning portion may include a coupling component, such as a set of locking lugs or an interlocking mechanism. In some embodiments, coupling the first processing portion to the aligning portion comprises inserting a portion of the first processing portion into the aligning portion and turning the first processing portion with respect to the aligning portion. Other coupling examples are also within the scope.

In some embodiments, the method comprises determining the current configuration of the indicator on the aligning portion. For example, the current configuration may be determined using a tester of the first processing portion. If the current configuration is a first configuration corresponding to the first processing portion, then method proceeds with processing the part using the first processing portion. Otherwise, the first processing portion is not used for processing.

Furthermore, if the part has been processed using the first processing portion, then the method proceeds with changing the current configuration of the indicator from the first configuration to a second configuration. The second configuration corresponds to a second processing portion. It should be noted that the part is only processed, if the current configuration is the first configuration when the first processing portion initially coupled to the aligning portion. In some embodiments, processing of the part using the first processing portion may be aborted for other reasons. If one of these conditions is not satisfied (e.g., if the current configuration is not the first configuration and/or if the part has not been processed using the first processing portion), then the current configuration of the indicator is retained. In either case, the method proceeds with decoupling the first processing portion from the aligning portion.

In some embodiments, the following set of operations is repeated one or more times: (a) coupling a processing portion, (b) determining the current configuration of the indicator, (c) processing the part if the current configuration corresponds to the coupled processing portion, (d) changing the current configuration, if the processing using this processing portion has been performed, and (e) decoupling the processing portion. Each set may be performed with a new processing portion.

Specifically, the method may comprise coupling a second processing portion to the aligning portion. The method also comprises determining the current configuration of the indicator of the aligning portion. For example, a tester coupled to the second processing portion may be used or this operation. If the current configuration is the second configuration corresponding to the second processing portion, then the method proceeds with processing the part using the second processing portion. Furthermore, if the part has been processed using the second processing portion, then the method may proceed with changing the current configuration of the indicator from the second configuration. Alternatively, if the part has not been processed using the second processing portion (e.g., if the current configuration is not the second configuration or some other reason), then the method does not involve changing the current configuration of the indicator from the second configuration. Finally, the method comprises decoupling the second processing portion from the aligning portion. As noted above, this set of operations may be repeated one or more times until all processing operations are completed. Since the current configuration of the indicator is verified every time prior to processing, all processing operations are performed according to the set sequence.

In some embodiments, the method further comprises separating the aligning portion from the part. For example, when all processing operations are performed the aligning portion may be separated from the part. As noted above, the aligning portion may be used as a reference for all processing portions. The separation may involve removing the clamps or other attaching mechanisms.

In some embodiments, determining the current configuration of the indicator is performed while the first processing portion is coupled to the first aligning portion. For example, the current configuration may be a particular spatial orientation of an indicator feature. In order to determine this current configuration precisely, the first processing portion needs to be first aligned with respect to the indicator. Since the indicator may be positioned on the aligning portion, this processing portion-to-indicator alignment may involve coupling of the first processing portion to the aligning portion.

Alternatively, determining the current configuration of the indicator may be performed prior to coupling the first processing portion to the first aligning portion. For example, the indicator may be a radio frequency identification (FRID) tag that may be scanned prior to coupling the first processing portion to the first aligning portion. This example is described below in more detail. In these embodiments, the coupling may not be performed if the current configuration is not the first configuration corresponding to the first processing portion, which allows to save time for coupling and decoupling.

In some embodiments, determining the current configuration of the indicator is performed using a tester after coupling the first processing portion to the aligning portion. The tester may be coupled to the first processing portion. The tester may include a test feature that may or may not engage a corresponding feature of the indicator, for example, depending on the current configuration of the indicator.

For example, the test feature of the tester may move into a new position or remain in the current position after coupling the first processing portion to the aligning portion. This movement or, more specifically, orientation of the test feature may reflect the current configuration of the indicator and used to determine the current configuration. For example, if the current configuration is the first configuration corresponding to the first processing portion, then the test feature of the tester may protrude into an indicator feature of the indicator after the first processing portion is coupled to the aligning portion. Alternatively, if the current configuration is not the first configuration corresponding to the first processing portion, then the test feature of the tester may not protrude into the indicator feature. In this later case, the indicator feature may not be aligned with the test feature thereby preventing the protrusions. The protrusion of the test feature into the indicator feature may be used as an indicator of the current configuration of the indicator.

In some embodiments, determining the current configuration of the indicator comprises determining an angular position of the indicator relative to the aligning portion. For example, the indicator may rotate with respect to its center axis. This rotation changes the angular orientation of one or more indicator features with respect to the aligning portion. Each configuration may correspond to a different angular position of these feature.

In these embodiments, changing the current configuration of the indicator from the first configuration to the second configuration may comprise rotating the indicator around a center axis of the indicator by a set angle. This rotation may be performed while the tester feature engages the indicator feature, for example, when a tester pin protrudes into an indicator opening. Specifically, the rotation may be achieved by rotating the tester feature while it engaging the indicator feature. The tester feature is rotated about the center axis of the tester using, for example, a drive supported on the first processing portion.

In some embodiments, determining the current configuration of the indicator comprises reading the data encoded on the indicator. For example, the indicator may be an RFID tag and this determining operation may involve scanning the RFID tag disposed on the aligning portion. This scanning may be performed using a tester of the first processing portion, which may be an RFID reader-writer. Changing the current configuration of the indicator, e.g., from the first configuration to the second configuration, may comprise writing a new code to the RFID tag. In this case, the indicator may be a rewritable RFID tag.

In some embodiments, processing the part using the first processing portion comprises receiving an output from the tester. The actual processing is performed after and only if the tester determines the current configuration being the first configuration. The output from the tester may be received by a controller, which controls operation of the first processing portion. The controller may also control changing the current configuration of the indicator. For example, the controller may control operation of the drive used to change the configuration of the indicator.

In some embodiments, processing using the second processing portion is sequential with processing using the first processing portion. In other words, processing using the second processing portion is performed after processing using the first processing portion without any intervening operations. In other words, processing using the second processing portion can only be performed after completing processing using the first processing portion. For example, the first processing portion may be a drill (e.g., an orbital drill with a drill bit), while the second processing portion may be a reamer.

In some embodiments, the indicator comprises multiple indicator features disposed about a center axis of the indicator. Each of these multiple indicator features may independently identify the current configuration of the indicator. For example, when the indicator is a ring, the indicator features may be openings spaced equally about the center axis of the indicator. Using these multiple indicator features allows to couple a processing portion at different orientations relative to the aligning portion.

In some embodiments, an apparatus used for sequential processing of a part may comprise a processing portion and a tester. The processing portion comprises a processing tool, such as a drill (e.g., an orbital drill with a drill bit) or a reamer. The processing portion may be operable for coupling to an aligning portion of the part. For example, the processing portion may have an end configures to interlock with the aligning portion. The tester of the apparatus may be coupled to the processing portion. The tester may be operable to determine the current configuration of an indicator disposed on the aligning portion. The tester controls operation of the processing tool based on the current configuration of the indicator.

In some embodiments, the apparatus also comprises the aligning portion and the indicator supported by the aligning portion. The indicator may be rotatable around the center axis of the indicator with respect to the aligning portion. In these embodiments, the current configuration of the indicator is determined based on the angular position of the indicator. In some embodiments, the indicator comprises a spring retaining the indicator relative to the aligning portion. The spring may also prevent uncontrollable rotation of the indicator. At the same time, the spring allows to change the angular position of the indicator, for example, when the indicator is advanced by the tester.

In some embodiments, the aligning portion comprises a coupling component for coupling to the processing portion. For example, the coupling component comprises a set of angled interlocking protrusions disposed about a center axis of the indicator.

In some embodiments, the aligning portion is supported by an indexing plate. The indexing plate may be also a component of the apparatus. The indexing plate may support one or more additional aligning portions. The indexing plate may be used for supporting the aligning portion with respect to a part.

The tester may comprise a tester feature for engaging an indicator feature of the indicator when the current configuration of the indicator has the current configuration corresponding to the processing portion. When the current configuration is than the configuration corresponding to the processing portion, the tester feature may not engage the indicator feature. For example, the tester feature may be a pin movable in the direction parallel to the center axis of the tester. The indicator feature may be an opening extending along the same direction, e.g., in the direction parallel to the center axis of the indicator. When the current configuration of the indicator is in the configuration corresponding to the processing portion, the pin may protrude into the opening thereby indicating that the current configuration is correct for processing using the existing processing portion. In some embodiments, the tester comprises a switch coupled to the pin. The pin triggers the switch and the circuit continuity including this pin is used for controlling the processing portion. In this example, the circuit continuity is used as an indication of the current configuration of the indicator.

In some embodiments, the tester feature is rotatable about the center axis of the tester. For example, the tester may comprise a drive for rotating the tester feature about the center axis of the tester. The drive is controlled by output from the processing portion. In some embodiments, the drive, the processing portion, and the tester may be coupled to the controller.

In some embodiments, the tester is a radio frequency identification (RFID) reader-writer, while the indicator is a rewritable radio frequency identification (RFID) tag. The current configuration of the indicator is encoded in the rewritable radio frequency identification (RFID) tag.

These and other embodiments are described further below with reference to the figures.

DETAILED DESCRIPTION

Figure 1:
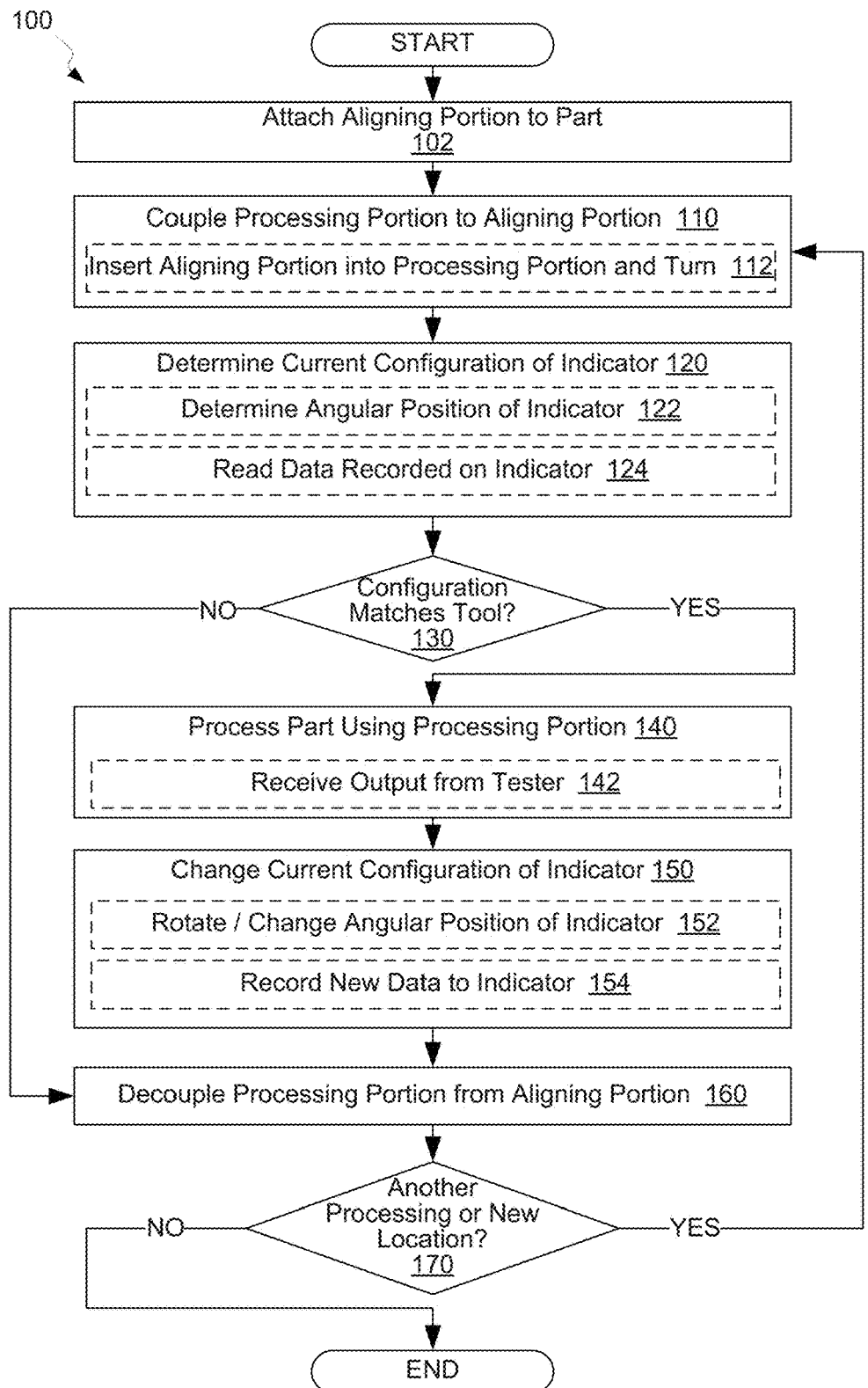
FIG. 1 is a process flowchart corresponding to a method of processing a part using a controlled sequence of processing operations, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Proposed methods and apparatuses are based on storing the information about next operations (to be performed on parts) right on these parts and checking this information before performing any further processing. This approach may be referred to as a local sequence control and should be distinguished from conventional external process controls, such as process controls used in complex robotic systems, computerized numerical control (CNC) tools, and the like. Specifically, an indicator may be coupled to a part at a processing location and used to track the sequence of operations performed on the part. The indicator may take different configurations or, more specifically, may be switched between different configurations. These configurations may be different orientations of mechanical components (e.g., an angular position of a ring), different information encoded on a memory (e.g., a code on a RFID chip), and the like.

These configurations may be changed while the indicator remains attached to the part. For example, the configuration may be switched to an initial configuration prior to performing any operations in a set sequence. After completing each operation, the configuration may be advanced to the next configuration. The current configuration is verified using testers coupled to processing portions prior to performing operations using processing tools of these processing portions. Depending on the current configuration and the processing portion, the operation using this processing portion may be performed or not. In other words, the current configuration has to correspond to a processing portion before this portion can be used for processing. As such, the indicator and its variable configurations are used to control the sequence of operations performed on the part.

One example of a method and an apparatus will now be briefly described. The indicator may be a movable ring or, more specifically, a rotatable ring. The indicator may be placed around the base of a drill jig bushing. The drill jig bushing is one example of the aligning portion. The processing portion, which may be a drilling machine (e.g., an orbital drill) in this example, locks into this drill jig bushing. The angular orientation of the indicator may be maintained by the resistance (e.g., friction provided by a spring) between the indicator and the aligning portion or a detent mechanism (e.g., an interlocking device). This feature prevents unintended rotation of the indicator (e.g., by an operator or vibration) and assures that the current configuration of the indicator is maintained until it needs to be changed. At the same time, the configuration may be changed, e.g., by the after completing the operation.

Control functions of the indicator in the above example may be understood from the following description of processing stages. In step 1 corresponding to operation 150 in FIG. 1 further described below, prior to performing any operations, the indicator may be brought into the first configuration. For example, the indicator may be aligned with the locking lug of the aligning portion, e.g., set at a particular angular orientation. In some embodiments, the indicator is already provided in the first configuration and this step is not necessary. In step 2 corresponding to operation 110 in FIG. 1 further described below, a processing portion comprising a processing tool is coupled to the aligning portion. For example, the locking lug may interlock with the collar of a drill. In step 3 corresponding to operation 120 in FIG. 1 further described below and prior to performing any processing operation, the tester of the processing portion determines the current configuration of the indicator. For example, the indicator may be a ring with an opening such that the current angular orientation of this opening relative to the locking nut determines the current configuration of the indicator. The tester may be a pin with a particular angular orientation of the interlocking drill collar. If the pin protrudes into the opening, then the current configuration of the indicator corresponds to the processing portions currently coupled to the aligning portion and the processing is performed during step 4 corresponding to operation 140 in FIG. 1 further described below. Alternatively, if the pin does not protrude into the opening (e.g., because the opening is not aligned with the pin), then the current configuration of the indicator does not correspond to the processing portions currently coupled to the aligning portion and the processing is not performed. If the processing is performed during step 4, the indicator is changed (advanced) into a new configuration corresponding to a subsequent operation during step 5 corresponding to a return to operation 150 in FIG. 1 further described below. For example, the indicator may be rotated by a set angle (e.g., 5°, 10°, 15°, 30°, or like) at operation 152 in FIG. 1. The angle may be determined based on the number of operations in a sequence, number of features on the indicator, sizes of all components, and other factors. It should be noted that if processing is not performed (step 4 is skipped), the indicator is not changed (step 5 is also skipped). In both cases, the processing portion is then decoupled from the aligning portion and the above steps (starting from step 2) may be repeated until completing the entire processing sequence. Each new processing operation is performed only if the current configuration of the indicator corresponds to the processing portion used for this operation. The changes of the current configuration ensure that operations are performed in accordance to a set sequence. In other words, additional operations would be indicated by additional movement or, more specifically, additional rotation of the indicator.

As noted above, prior to each operation, the processing portion determines the current configuration of the indicator, e.g., whether the indicator is in the position corresponding to this processing portion. For example, if the processing portion is setup for a pilot hole, it would verify that the indicator is in the first position before proceeding with drilling the pilot hole. If the pilot hole has been previously drilled and/or the indicator is not in the first portion, then the processing portion set up for pilot hole drilling does not perform any operations. The determining operation may be performed prior, after, or during the coupling operation, e.g., when the processing portion is coupled the aligning portion.

Continuing with the above example, if the indicator is in the first position, the pilot hole is drilled. If the pilot hole drilling operation was successful, then the processing portion moves the indicator into the second position. For example, the processing portion may include a tester used to determine the current configuration of the indicator. The tester may be coupled to a drive for rotating the tester around the tester axis. When the tester is engaged to the indicator (e.g., for determining the current configuration), movement of the tester may cause movement of the indicator thereby changing the current configuration of the indicator.

Continuing with the above example, if the processing portion is setup for full size hole drilling, then it would verify that the indicator is in the second configuration before processing the part. One having ordinary skill in the art would understand that any number of configurations may be used with each configuration corresponding to a different processing operation in the sequence. For example, after completing the full size hole drilling, the indicator may be advanced into a third configuration corresponding to a third processing portion used for reaming the hole. The indicator may be advanced, for example, by the tester of the second processing portion. The third processing portion then determines the current configuration of the indicator. If the indicator is in the third configuration, then processing (e.g., reaming of the hole) may be performed. In some embodiments, a processing portion that performed the last operation in the sequence may reset the indicator into the first configuration for use on another processing location.

Examples of Methods Using Controlled Processing Sequences

Figure 2A:
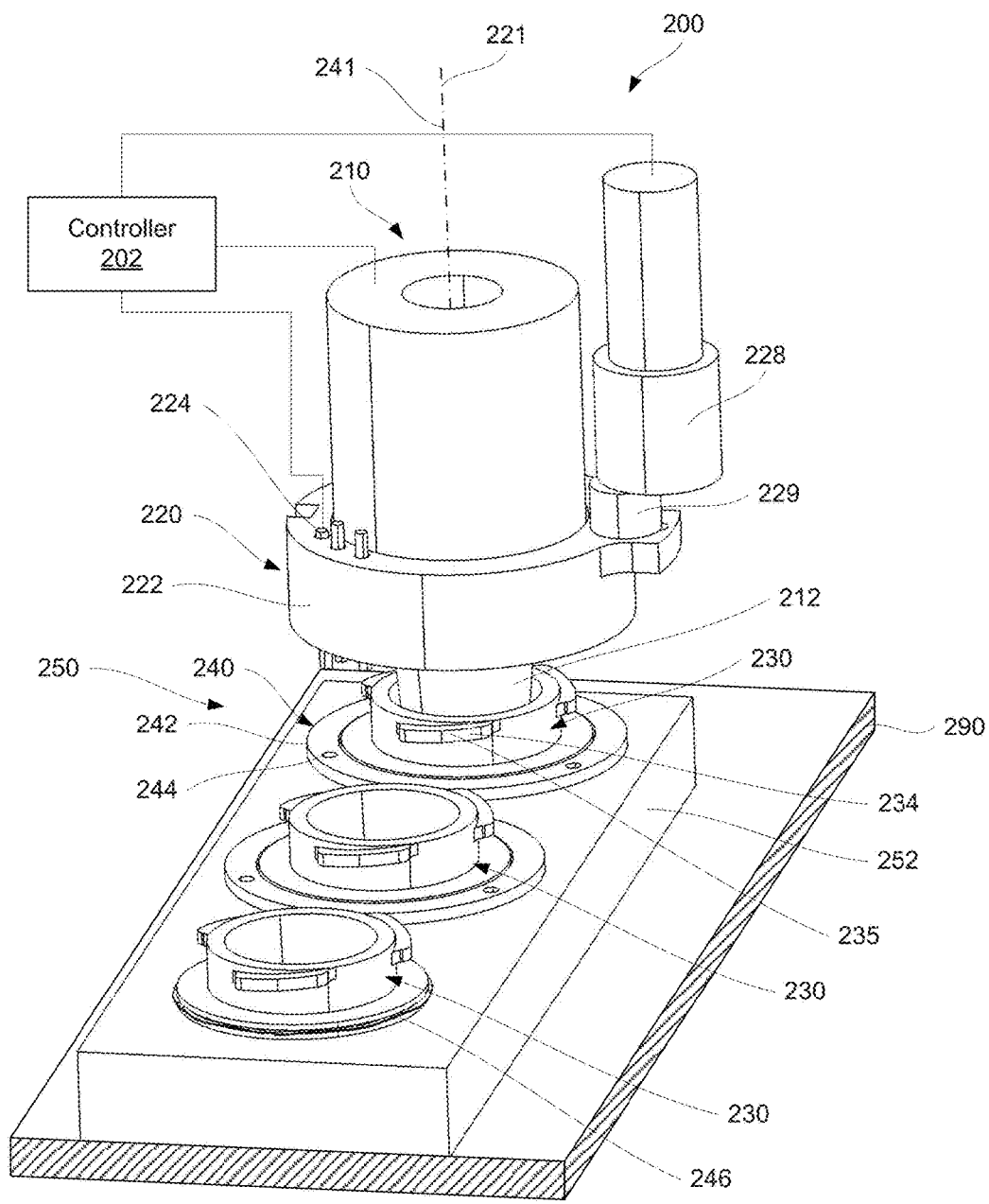
FIG. 2A is a schematic representation of an apparatus for processing parts using controlled sequences of processing operations prior to coupling the processing portion to the aligning portion, in accordance with some embodiments.
Figure 2B:
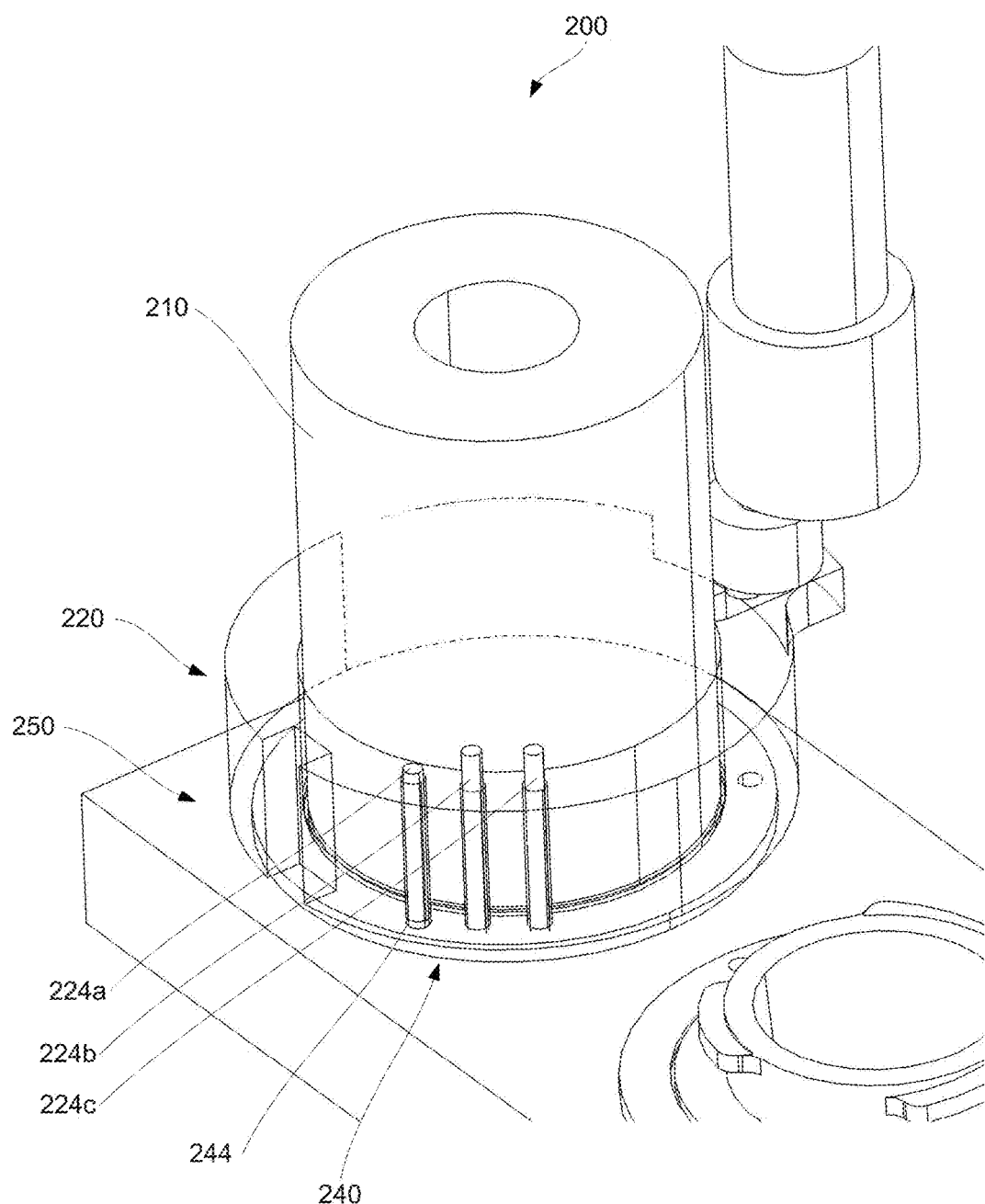
FIG. 2B is a schematic representation of the apparatus also shown in FIG. 2B after coupling the processing portion to the aligning portion, in accordance with some embodiments.
Figure 5A:
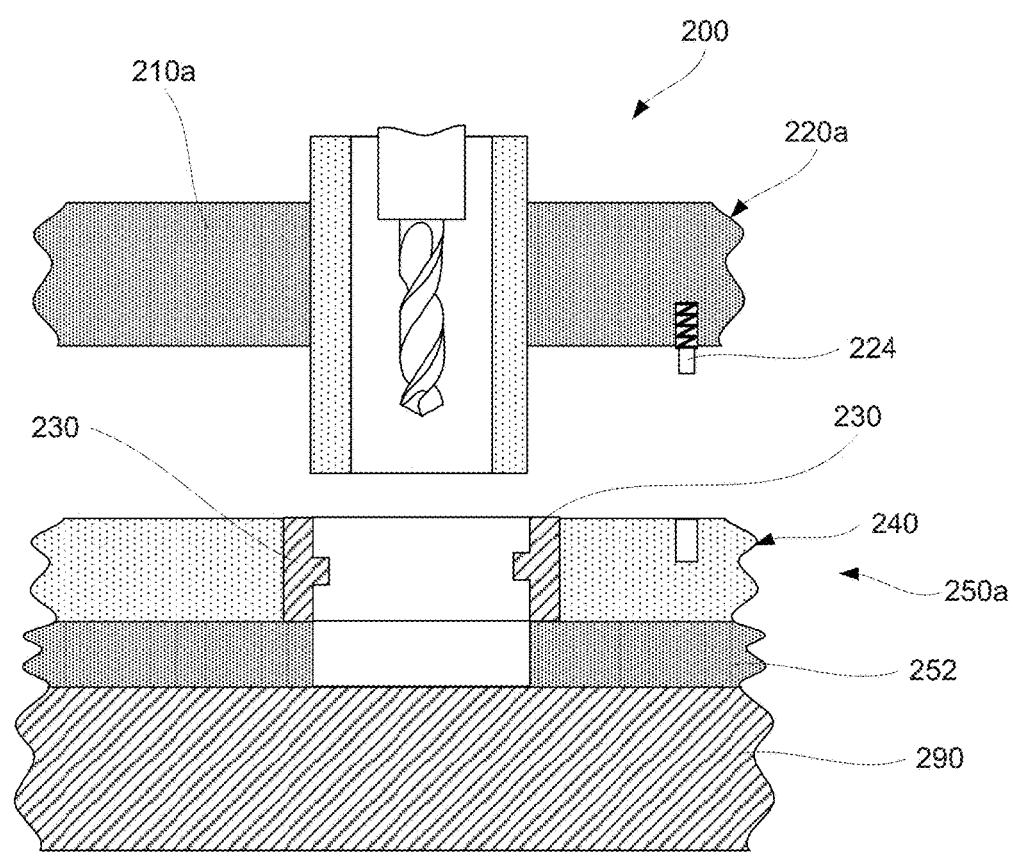
FIGS. 5A-5D are section cut view of the apparatus at different stages during processing of the part using a first processing portion, in accordance with some embodiments.
Figure 5B:
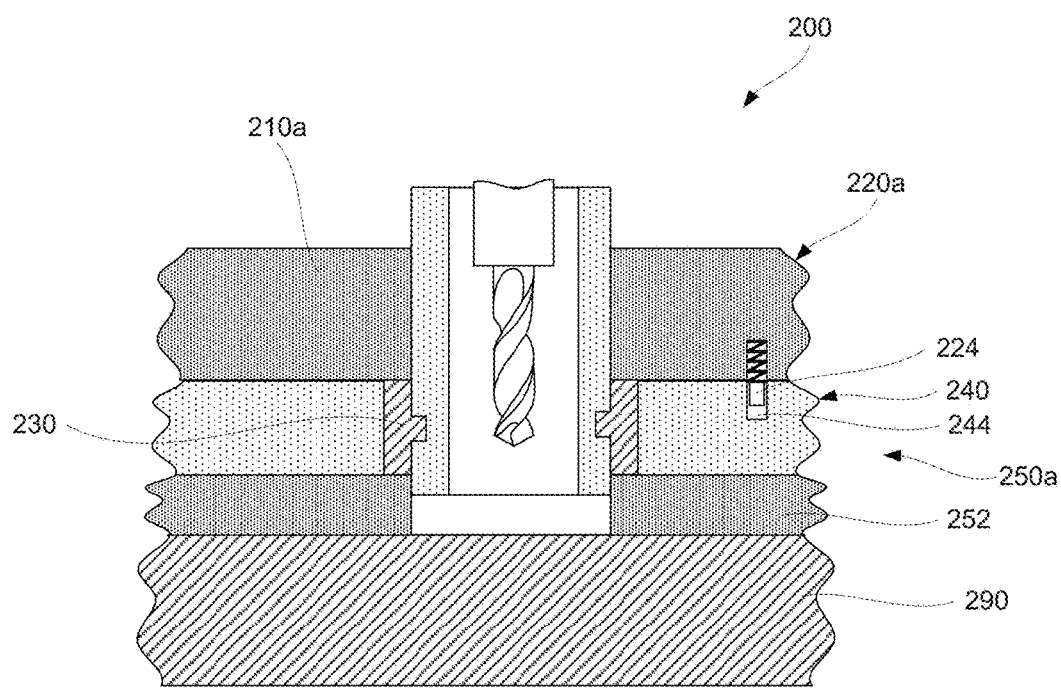
Figure 6A:
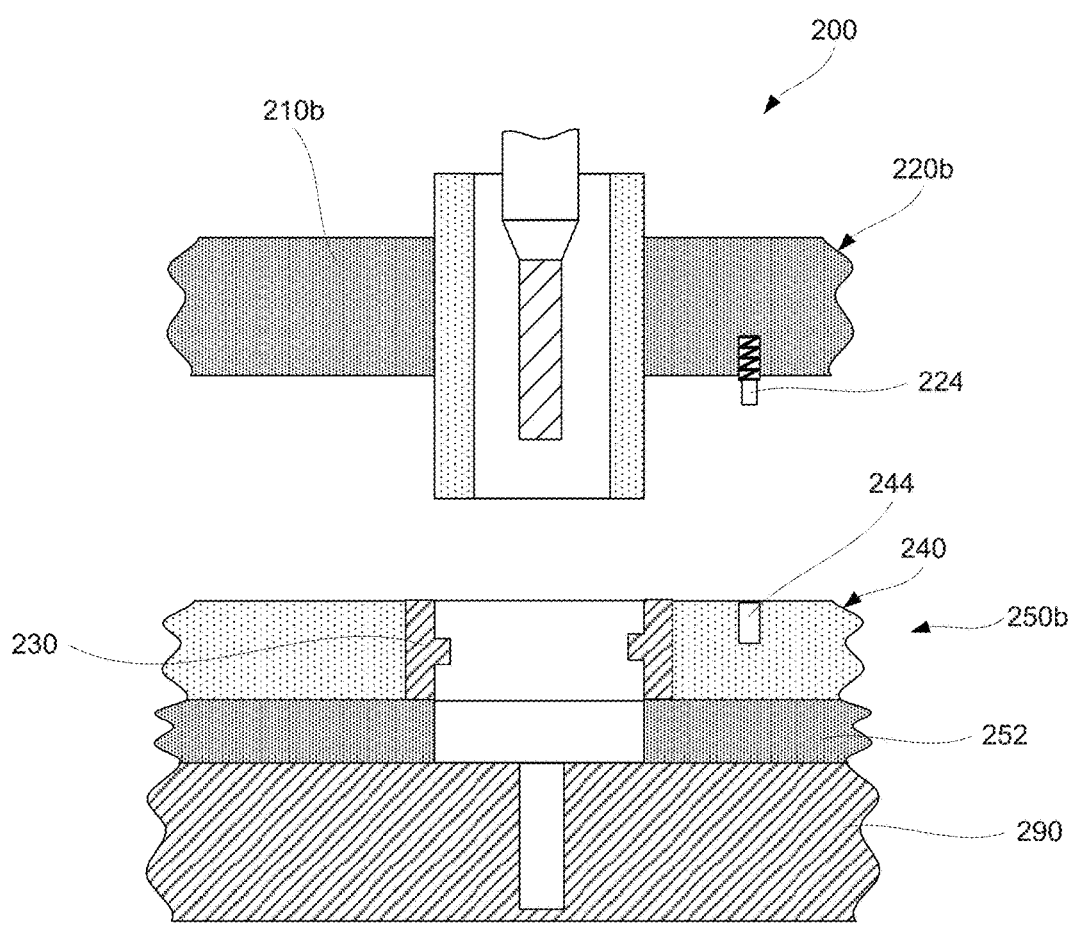
FIGS. 6A-6D are section cut view of the apparatus at different stages during processing of the part using a second processing portion, in accordance with some embodiments.
Figure 6B:
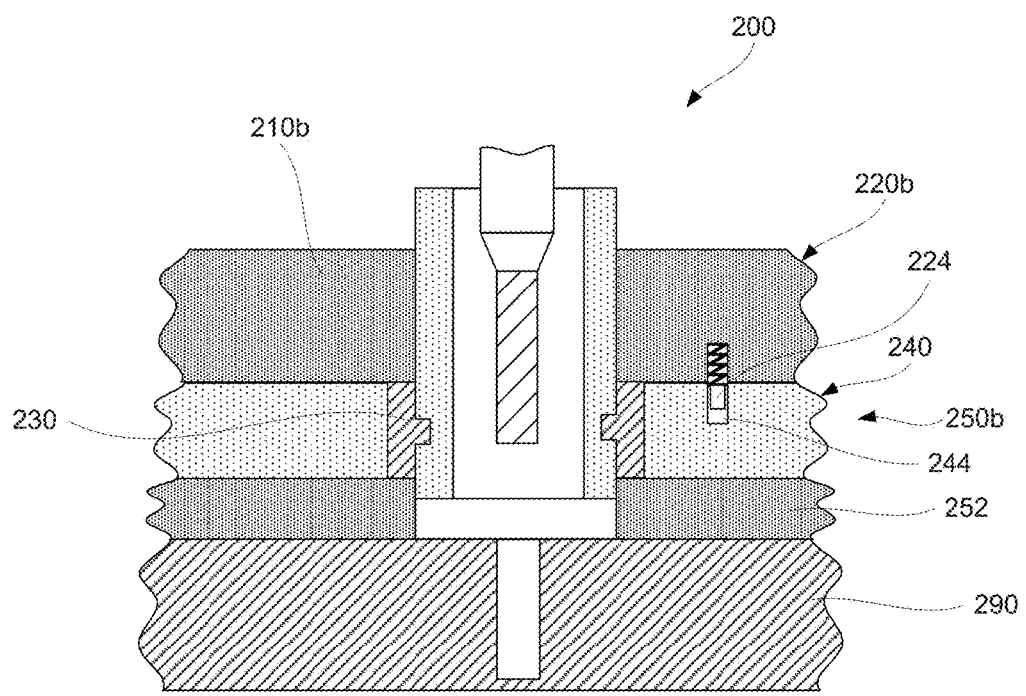

FIG. 1 is a process flowchart corresponding to method 100 of processing a part, such as part 290 (shown in FIG. 2A), using a controlled sequence of processing operations, in accordance with some embodiments. The sequence may include any number of operations. Furthermore, one having ordinary skill in the art would understand that any kind of operations may be used, drilling, polishing, cutting, attaching, and the like. The operations of method 100 in FIG. 1 will be described with reference to the other FIGS. included herein. FIG. 2A is a schematic representation of apparatus 200 prior to coupling processing portion 210 to aligning portion 230, while FIG. 2B is a schematic representation of this apparatus 200 after the coupling. Furthermore, FIGS. 5A and 5B are section cut views of apparatus 200 before and after coupling first processing portion 210a to aligning portion 230. Similarly, FIGS. 6A and 6B are section cut views of apparatus 200 before and after coupling second processing portion 210b to aligning portion 230. Processing portions 210a and 210b may be different embodiments of processing portion 210. It should be noted that different processing portions may be coupled to aligning portion 230 in the same manner.

Figure 2C:
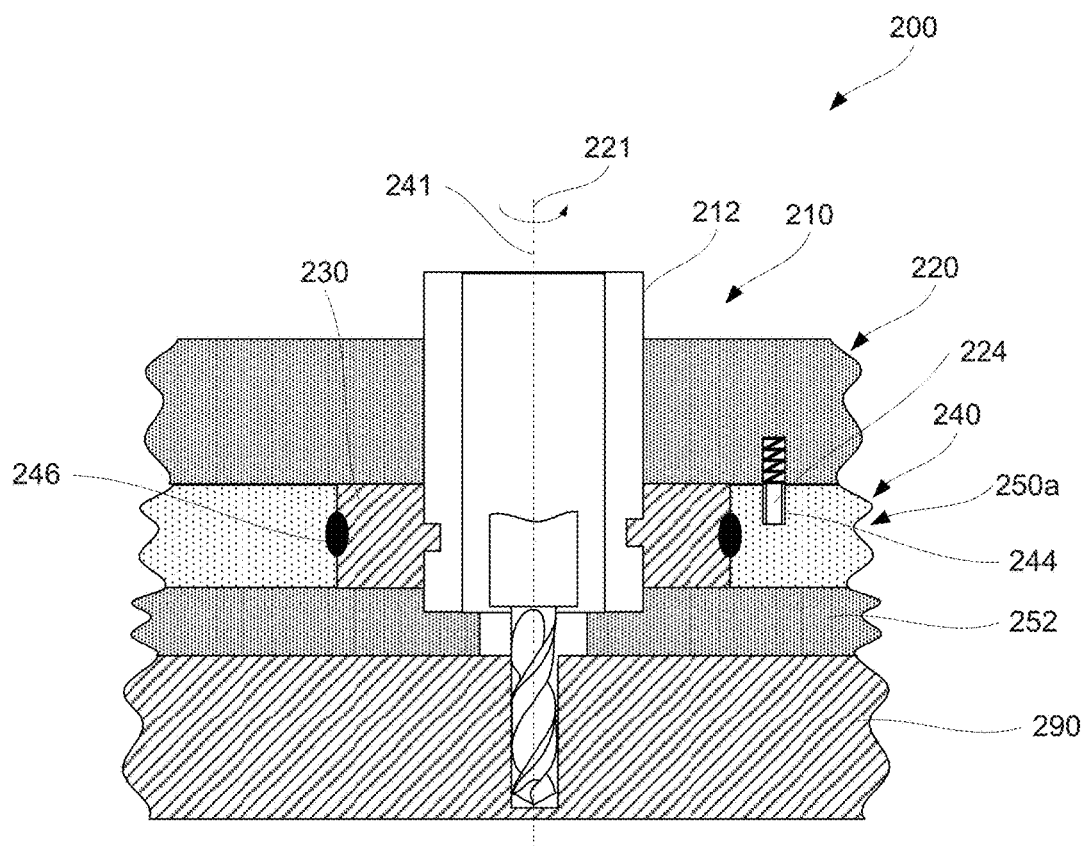
FIG. 2C is a schematic section cut view of the apparatus shown in FIGS. 2A and 2B illustrating various internal components when the aligning portion is coupled to the processing portion, in accordance with some embodiments.

Method 100 may commence with attaching aligning portion 230 to part 290 (block 102 in FIG. 1). Various examples of aligning portion 230 and part 290 are shown in FIGS. 2A, 2C, and 5A, among other places. Aligning portion 230 may be attached directly to part 290 or using another component. For example, aligning portion 230 may be supported by indexing plate 252 (as, e.g., shown in FIG. 2A). In some embodiments, the same indexing plate 252 may include multiple aligning portions 230 (as, e.g., shown in FIG. 2A) for processing part 290 at different processing locations. In other words, each aligning portion 230 may correspond to a separate and different processing location on part 290. Indexing plate 252 may be aligned with respect to part 290 and attached to part 290 using, for example, clamps, magnets, or any other suitable attachment mechanism. It should be noted that the attachment of index plate 252 to part (or attachment of aligning portion 230 to part 290, if attached directly) is temporary. Indexing plate 252 ensures alignment of different aligning portions 230 with respect to each other and simplifies the overall alignment process while multiple processing locations are involved. Indexing plate 252 and/or individual aligning portion 230 may remain attached to the part until all processing operations are performed at this processing location.

Returning to FIG. 1, method 100 may proceed with coupling first processing portion 210a to aligning portion 230 (block 110 in FIG. 1). For example, aligning portion 230 may include coupling component 234, such as a set of locking lugs 235 (as, e.g., shown in FIG. 2A). Another example of coupling component 234 is an interlocking mechanism. First processing portion 210a has a corresponding coupling component.

In some embodiments, coupling first processing portion 210a to aligning portion 230 comprises inserting a portion of first processing portion 210a into aligning portion 230 and turning first processing portion 210a with respect to aligning portion 230 (block 112 in FIG. 1). Once coupled, coupling component 234 of aligning portion 230 may engage the corresponding component of first processing portion 210a and prevent first processing portion 210a from moving with respect to aligning portion.

In some embodiments, processing portion 210 may be coupled to aligning portion 230 at various different angular configurations. Referring to FIG. 2A, coupling component 234 is a set of three locking lugs 235 distributed at 120° with respect to each other. In this example, processing portion 210 may be coupled to aligning portion 230 at any of three different orientations offset with respect to each other by 120°. This coupling flexibility adds specific requirements to indicator 240 and/or tester of aligning portion 230. Specifically, indicator 240 may be capable of indicating its current configuration regardless of coupling orientation of processing portion 210 and aligning portion 230. In some embodiments, this function is performed by tester 220 in addition to or instead of indicator 240.

Method 100 comprises determining current configuration 250 of indicator 240 (block 120 in FIG. 1). As shown in FIGS. 2A and 2B, indicator 240 may be positioned in current configuration 250. Current configuration 250 may be any one of various different configurations which may be reflected by the spatial orientation of indicator 240, or by the information encoded on indicator 240. For example, indicator 240 may be a ring rotatably coupled to aligning portion 230 as, for example, shown in FIGS. 2A, 2B and 3A-3B. The current configuration may correspond to the angular orientation of this ring relative to stationary parts of aligning portion 230. In this case, determining current configuration 250 may involve determining the angular position of indicator 240 (block 122 in FIG. 1).

Figure 3A:
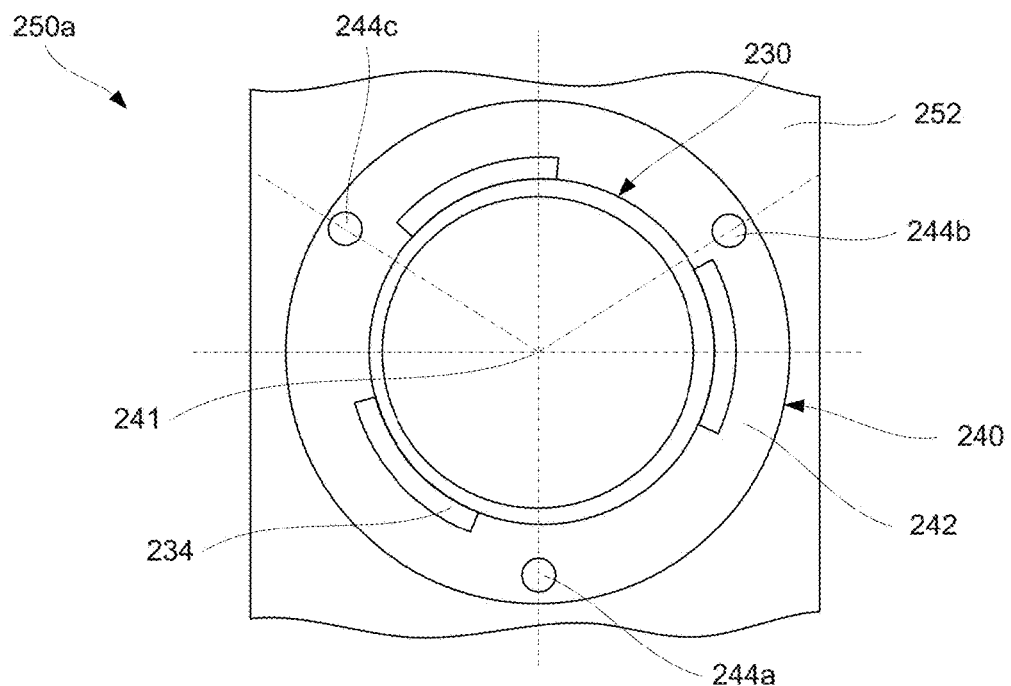
FIGS. 3A and 3B are top schematic views of the indicator illustrating different configurations of this indicator, in accordance with some embodiments.
Figure 3B:
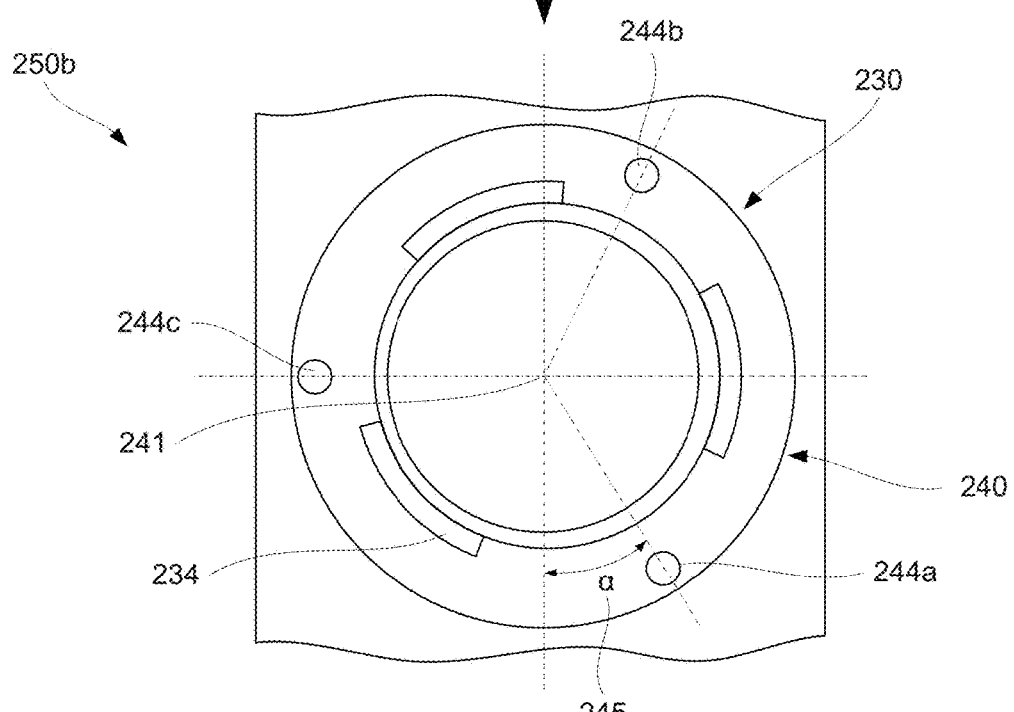

FIG. 3A illustrates one angular orientation with first indicator feature 244a having the lowest position in this view, corresponding to first configuration 250a. FIG. 3B illustrates another angular orientation with first indicator feature 244a rotated counter-clockwise by an offset angle α (element 245), corresponding to second configuration 250b. Current configuration 250 may be determined to be first configuration 250a or second configuration 250b at operation 122. Current configuration 250 may also be determined to be other possible configurations corresponding to different angular orientations of indicator 240. These angular orientations/configurations may correspond to different processing tools or processing portions as further described below. The offset angle may be any value between 0° and 360° such as between 5° and 60° or more specifically between 10° and 30°.

Referring to FIGS. 3A-3B, indicator 240 may have multiple indicator features 244a-244c. Any one of indicator features 244a-244c may be indicator feature 244 described with reference to FIG. 2A. Specifically, indicator features 244a-244c may be openings formed in indicator body 242. Indicator body 242 may have a ring shape as shown in FIGS. 3A-3B. Aligning portion 230 and indexing plate 252 are shown for reference. While three features 244a-224c are shown in FIGS. 3A-3B, one having ordinary skills in the art would understand that any number of features can be used. Each feature may independently identify current configuration of indicator 240. Different features may be used to allow different types of coupling between processing portion 210 and aligning portion 230. As described above, in one example, processing portion 210 may be coupled to aligning portion 230 at any of three orientations, which are offset with respect to each other by 120°. As shown in FIGS. 3A-3B, features 244a-224c are also offset from each other by 120°. Depending on the coupling orientation of processing portion 210 and aligning portion 230, one of features 244a-224c will be used for identification of current configuration 250. One having ordinary skills in the art would understand that this feature may be also implemented in tester 220 rather than indicator 240 or both tester 220 and indicator 240.

Figure 3C:
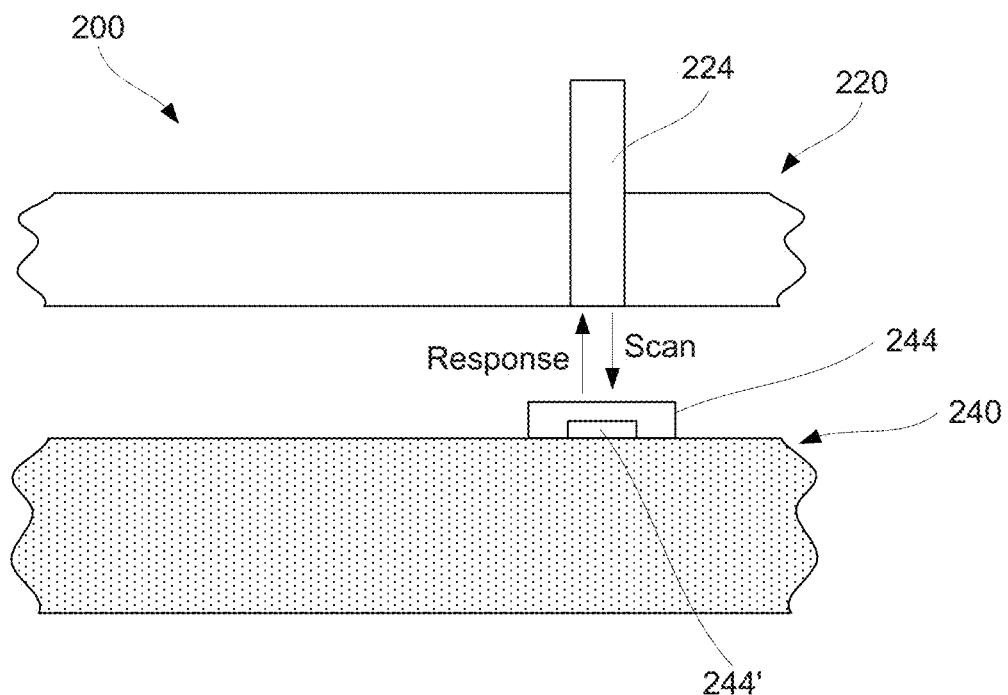
FIG. 3C is a section cut view of the apparatus comprising an RFID based indicator, in accordance with some embodiments.

In some embodiments, current configuration 250 is indicated by information encoded on indicator 240, which may be recorded at operation 154 in FIG. 1. For example, FIG. 3C illustrates an indicator 240 with an indicator feature 244 comprising an RFID tag or, more specifically, a rewritable RFID tag. The code stored in the memory 244' of this RFID tag may correspond to different processing tools. In this case, determining current configuration 250 comprises scanning the RFID tag disposed on aligning portion 230 (block 124 in FIG. 1). This operation is schematically represented by FIG. 3C. In this example, there is no need for a direct physical contact between tester feature 224, which may be an antenna of the RFID reader, and indicator feature 244. Indicator feature 244 may include rewritable memory 244' for storing different configurations, such as at operation 154 in FIG. 1.

Current configuration 250 may be determined using tester 220. In some embodiments, tester 220 may be mechanically coupled to processing portion 210 or may be a part of processing portion 210. As such, each processing portion may have its own tester, e.g., first processing portion 210a having tester 220*a* (shown in FIGS. 5A-5D), while second processing portion 210*b* having tester 220*b* (shown in FIGS. 6A-6D). Alternatively, apparatus 200 may have one tester 220 that is communicatively coupled to each new processing portion when needed.

Figure 4A:
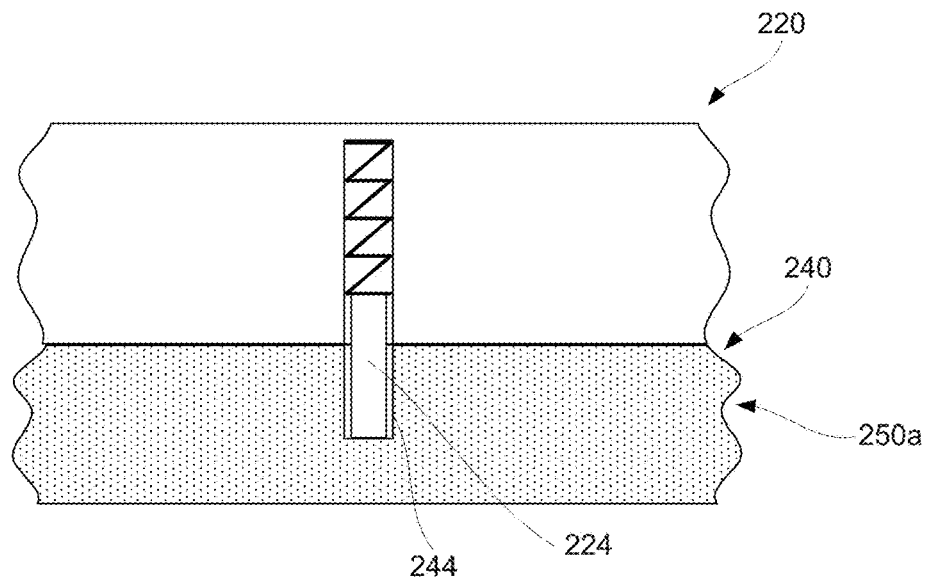
FIG. 4A is a section cut view of the tester and the indicator illustrating an example when the tester feature engages the indicator feature, in accordance with some embodiments.

Tester 220 may include test feature 224 that may or may not engage corresponding indicator feature 244. For example, when current configuration 250 corresponds to currently coupled processing portion 210, test feature 224 may engage corresponding indicator feature 244 as, for example, shown in FIG. 4A. In this example, test feature 224 is a spring loaded pin, and it protrudes in indicator feature 244, which is an opening. As such, when current configuration 250 corresponds to currently coupled processing portion 210, test feature 224 may be aligned with indicator feature 244, which may advance test feature 224 and/indicator feature 244 into a new position or, contrary, keep test feature 224 and/indicator feature 244 in their original positions.

Figure 5C:
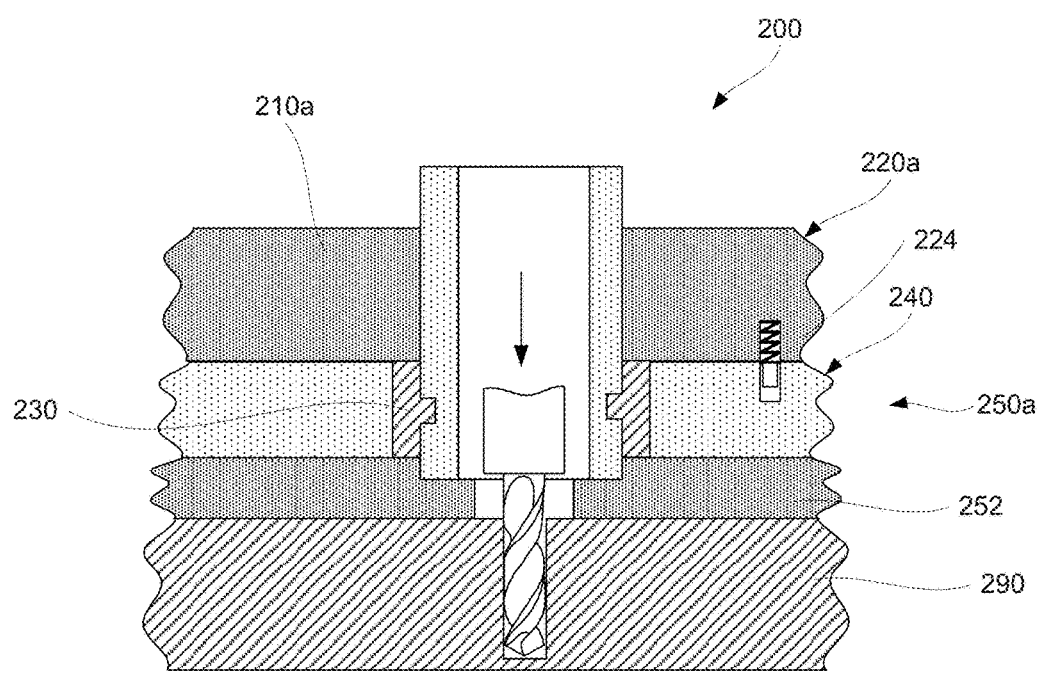
Figure 5D:
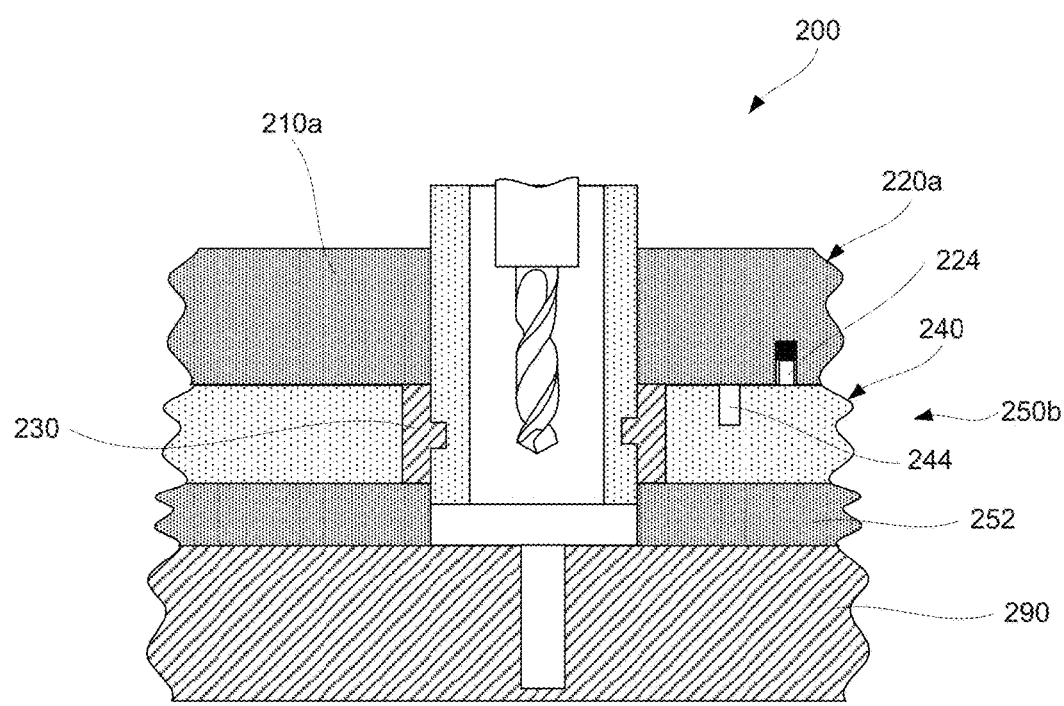
Figure 6C:
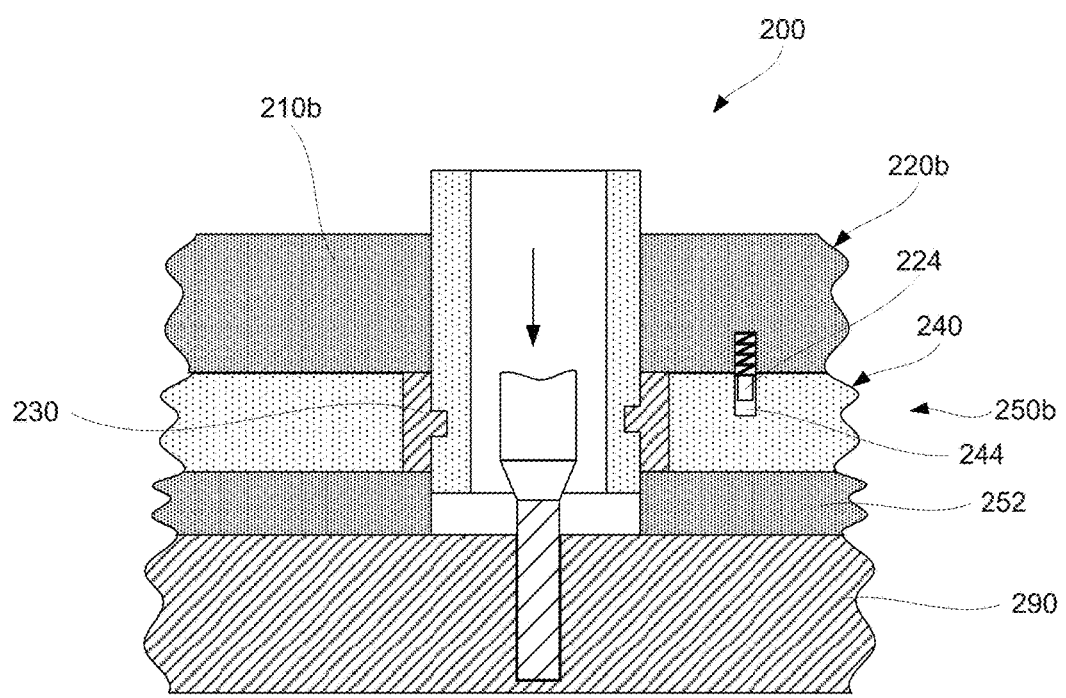

FIGS. 5A-5D illustrate a coupling interaction between first processing portion 210*a* and indicator 240. FIG. 5A illustrates first processing portion 210*a* and indicator 240 prior to coupling. FIG. 5B illustrates first processing portion 210*a* coupled to indicator 240. FIG. 5C illustrates processing of part 290 by first processing portion 210*a* after determining that current configuration 250 of indicator 240 is first configuration 250*a*. FIG. 5D illustrates a coupling interaction between first processing portion 210*a* and indicator 240 in second configuration 250*b*. Referring to FIGS. 5A and 5B showing coupling of first processing portion 210*a* to aligning portion, test feature 224 may remain extended because it is aligned with and protrudes into indicator feature 244. In this example, test feature 224, which is also a pin, does not change its position and remain extended. After coupling, the extended pin indicates current configuration 250*a* is first configuration 250*a* corresponding to first processing portion 210*a*. Now referring to FIG. 5D, in which current configuration 250 is second configuration 250*b*, test feature 224 of first processing portion 210*a* is not aligned with indicator feature 244. Test feature 224 does not remain extended when first processing portion 210*a* is coupled to aligning portion 230. [0060.01] One having ordinary skills in the art would understand similar examples shown in FIGS. 6A-6B and 6D corresponding to second processing portion 210*b*. FIGS. 6A-6D illustrate a coupling interaction between second processing portion 210*b* and indicator 240. FIG. 6A illustrates second processing portion 210*b* and indicator 240 prior to coupling. FIG. 6B illustrates second processing portion 210*b* coupled to indicator 240. FIG. 6C illustrates processing of part 290 by second processing portion 210*b* after determining that current configuration 250 of indicator 240 is second configuration 250*b*. FIG. 5D illustrates a coupling interaction between second processing portion 210*b* and indicator 240 in first configuration 250*a*. In all these examples, an extended tester feature 224 or test feature 224 that does not change its position during coupling may be used as an indication that current configuration 250 corresponds to coupled processing portion 210. Of course, alternative examples are also within this scope. For example, an extended tester feature 224 or test feature 224 that changes its position during coupling may be used as an indication that current configuration 250 does not correspond to coupled processing portion 210.

In some embodiments, determining current configuration 250 of indicator 240 comprises determining angular position of indicator 240 relative to aligning portion 230 as, for example, shown in FIGS. 3A-3B. For example, indicator 240 may rotate with respect to its center axis 241. This rotation causes rotation of one or more indicator features 244*a*-244*c* about this center axis 241. Each configuration may correspond to a different angular position of these indicator features 244*a*-244*c*. In these embodiments, changing current configuration 250 of indicator 240 from first configuration 250*a* (FIG. 3A) to second configuration 250*b* (FIG. 3B) may comprise rotating indicator 240 around a center axis 241 of indicator 240 by a set angle. This rotation may be performed while a tester feature 224 engages an indicator feature 244. Furthermore, this rotation may involve rotating tester feature 224 engaging indicator feature 244 about center axis 221 of tester 220. This may involve rotating a tester body 222 of tester 220 supporting tester feature 224 around center axis 221 using, for example, drive 228 supported on first processing portion 210*a*. In some embodiments, center axis 221 may be the same axis as center axis 241 (as shown in FIG. 2A).

In some embodiments, tester 220 is only capable of determining if the current configuration 25P corresponds to the particular processing portion currently coupled to aligning portion 230 without being able to identify the actual current configuration 250. In other words, indicator 240 may be operable as a "Go-No Go" device without providing a more refined feedback. Alternatively, tester 220 may be capable to identify the exact current configuration 250 regardless of determining whether the current configuration corresponds to the particular processing portion currently coupled to aligning portion 230. For example, FIG. 2B illustrates tester 220 having three test features 224*a*, 224*b*, and 224*c*. In the illustrated example, test feature 224*a* protrudes into indicator feature 244. This may correspond to indicator 240 being in first configuration 250*a*. However, test feature 224*b* protruding into indicator feature 244 may indicate indicator 240 being in second configuration 250*b*. In a similar manner, test feature 224*c* protruding into indicator feature 244 may indicate indicator 240 being in a third configuration (not shown). As such, tester 220 may be operable to differentiate between multiple configurations and not simply indicate whether current configuration 250 corresponds to another configuration. This feedback may be used to select a particular processing portion for the next iteration of operations represented by blocks 110, 120, 130, 140, 150, and 160 in FIG. 1 rather than proceeding with a trial and error approach.

In some embodiments, determining current configuration 250 of indicator 240 is performed while first processing portion 210*a* is coupled to aligning portion 230. In other words, the coupling operation (block 110 in FIG. 1) is performed prior to the determining current configuration operation (block 120 in FIG. 1). For example, current configuration 250 may be a particular spatial orientation of indicator feature 244. In order to determine this current configuration 250 precisely, first processing portion 210*a* needs to be aligned with respect to indicator 240, which may involve coupling of first processing portion 210*a* to aligning portion 230. indicator 240 may be positioned on aligning portion 230.

Alternatively, determining current configuration 250 of indicator 240 may be performed prior to coupling first processing portion 210*a* to first aligning portion 230. In other words, the determining current configuration operation (block 120 in FIG. 1) is performed before the coupling operation (block 110 in FIG. 1). In these embodiments, the coupling operation (block 110) may not be performed if current configuration 250 is not first configuration 250*a* corresponding to first processing portion 210*a*. As such, the decoupling operation (block 160 in FIG. 1) is not performed either. This approach allows saving processing time associated with the coupling operation (block 110) and the decoupling operation (block 160). However, precise determination of current configuration may necessitate coupling.

Method 100 includes a decision (block 130 in FIG. 1) to determine whether current configuration 250 of indicator 240 matches the processing tool coupled to aligning portion 230. Specifically, if current configuration 250 is first configuration 250a corresponding to first processing portion 210a, then method 100 proceeds with processing part 290 using first processing portion 210a (block 140 in FIG. 1). Otherwise, i.e., if current configuration 250 is not first configuration 250a, first processing portion 210a is not used for processing. In this later case, method 100 may proceed directly to decoupling first processing portion 210a from aligning portion 230 (block 160 in FIG. 1).

Some examples of processing operations (block 140 in FIG. 1) include, but not limited to, drilling, reaming, chamfering, deburring, cleaning, inspecting, and the like. It should be noted that these processing operations are arranged into a specific sequence with the sequence corresponding to a sequence of current configurations of indicator 240. A couple examples of processing part is illustrated in FIGS. 5C and 6C.

In some embodiments, processing part 290 using first processing portion 210a comprises receiving an output from tester 220 (block 142 in FIG. 1). The output may be received only if tester 220 determines that current configuration 250 is first configuration 250a. For example, the output from tester 220 may be received by controller 202 controlling operation of first processing portion 210a. Depending on this output, controller 202 may activate first processing portion 210a or not. It should be noted that controller 202 may also receive output from first processing portion 210a indicating that the processing operation (block 140 in FIG. 1) is completed. Furthermore, controller 202 may also control operation of drive 228 used to change configuration of indicator 240 (block 150 in FIG. 1), e.g., based on the output from first processing portion 210a.

If part 290 has been processed using first processing portion 210a (which also means that current configuration 250 is first configuration 250a), then method 100 proceeds with changing current configuration 250 of indicator 240 (block 150 in FIG. 1). Specifically, current configuration 250 may be changed from first configuration 250a to second configuration 250b corresponding to second processing portion 210b. As previously described, changing the configuration of indicator 240 may involve rotating or otherwise changing the angular position of indicator 240 (operation block 152 in FIG. 1). As also previously described, changing the configuration of indicator 240 may alternatively involve recording or encoding new data to an indicator comprising a rewritable RFID tag that corresponds to a different processing portion.

In some embodiments, processing part 290 using second processing portion 210b is a sequential operation performed after processing part 290 using first processing portion 210a. In other words, processing using second processing portion 210b can only be performed after completing processing using first processing portion 210a. For example, first processing portion 210a may be a drill (e.g., an orbital drill having a drill bit), while second processing portion may be a reamer. Other examples of processing portions include but are not limited to a power feed drill, a chamfer tool, a back chamfer tool, a deburring tool, a vacuum drill, a countersink tool, a hole cleaning device, and a hole inspection device.

Method 100 then proceeds with decoupling first processing portion 210a from aligning portion 230 (block 160 in FIG. 160). The decoupling operation may be effectively reverse of the coupling operation (block 110 in FIG. 1) described above. For example, first processing portion 210a may be turned with respect to aligning portion 230 and pulled out of aligning portion 230.

At operation block 170 in FIG. 1, it is determined whether one or more additional processing operations need to be performed on part 290. If no additional processing operations need to be performed on part 290, then method 100 ends. If additional processing operations need to be performed (e.g., current configuration 250 determined during the determining operation (block 120 in FIG. 1) does not correspond to the last processing operation in a sequence), then a set of operations (e.g., blocks 110, 120, 130, 140, 150, and 160 in FIG. 1) may be performed at the same processing location with a different processing portion. Current configuration 250 of indicator 240 may be adjusted (block 150 in FIG. 1) during each set when the processing operation (block 140 in FIG. 1) is performed during this set. For example, some sets may result in current configuration 250 not corresponding to the processing tool coupled to aligning portion 230 and the processing operation (block 140) may not be performed. In this case, current configuration 250 may remain the same after the set.

In some embodiments, a second iteration method 100 may comprise coupling second processing portion 210b to aligning portion 230, which effectively repeats the coupling operation (block 110 in FIG. 1) described above. Second processing portion 210b may be operable to performed a different processing operation (block 140 in FIG. 1) than first processing portion 210a. For example, first processing portion 210a may be a drill bit, while second processing portion 210b may be a reamer. FIGS. 6A and 6B are section cut views of apparatus 200 before and after coupling second processing portion 210b to aligning portion 230, respectively. As shown in FIGS. 6A and 6B, second processing portion 210b may be associated with or coupled to a different tester 220b.

Figure 6D:
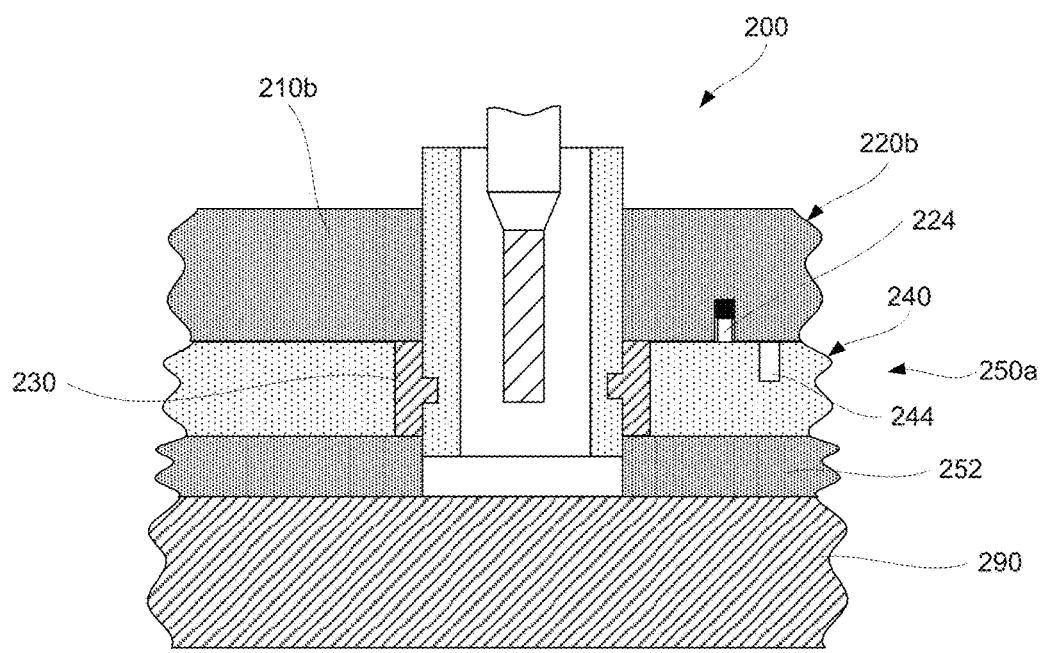

Method 100 may involve determining current configuration 250 of indicator 240 of aligning portion 230 using tester 220b coupled to second processing portion 210b. For example, FIG. 6B illustrates indicator 240 being in second configuration 250b and, as a result, test feature 224 protrudes into indicator feature 244. FIG. 6C illustrates processing of part 290 by second processing portion 210b after determining that current configuration 250 of indicator 240 is second configuration 250b. FIG. 6D illustrates another example where indicator 240 is in first configuration 250a. For example, processing of part 290 using first processing portion 210a has not been yet performed. In this case, test feature 224 does not protrude into indicator feature 244. Thus, as shown in FIG. 6D, test feature 224 of tester 220b is misaligned with indicator feature 244.

Returning to FIG. 1 and decision block 130, if current configuration 250 is second configuration 250b corresponding to second processing portion 210b, then method 100 proceeds with processing part 290 using second processing portion 210b (block 140 in FIG. 1). If the processing operation (block 140) is performed, then method 100 the proceeds with changing current configuration 250 of indicator 240 from second configuration 250b (block 150 in FIG. 1). For example, indicator 240 may be switched to a third configuration, if there is another operation in the sequence. If the second processing operation was the last operation, then indicator 240 may be switched to its initial configuration, e.g., first configuration 250a.

Method 100 then comprises with decoupling second processing portion 210b from aligning portion 230 (block 160 in FIG. 1). This set of operations may be repeated one or more times until all processing operations are completed. Since current configuration of indicator is verified every time prior to processing, all processing operations are performed according to a set sequence.

In some embodiments, method 100 further comprises separating aligning portion 230 from part 290. For example, when all processing operations are performed aligning portion 230 may be separated from part 290. At same time, maintaining aligning portion 230 attached to part 290 ensures alignment when different processing is performed. In other words, aligning portion 230 may be used as a reference for all processing portions.

Examples of Apparatuses for Controlled Processing Sequences

FIGS. 2A and 2B are schematic representation of apparatus 200 for processing parts using controlled sequences of processing operations, in accordance with some embodiments. Various processing aspects are described above with reference to FIG. 1.

Apparatus 200 may comprise processing portion 210 and tester 220. Processing portion 210 may comprise processing tool 212, such as a drill bit or a reamer. Processing portion 210 may be operable for coupling to aligning portion 230. Aligning portion 230 may be a part of apparatus 200 or may be a standalone component.

Tester 220 of apparatus 200 may be coupled to processing portion 210. Tester 220 may be operable to determining a current configuration 250 of an indicator 240 disposed on aligning portion 230. Tester 220 controls operation of processing tool 212 based on current configuration 250 of indicator 240.

Figure 4B:
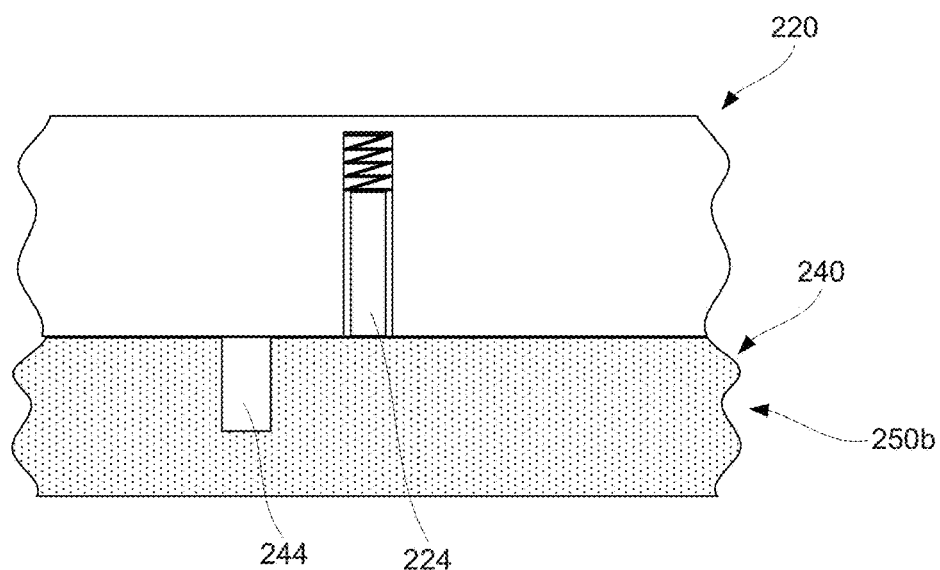
FIG. 4B is a section cut view of the tester and the indicator of FIG. 4A illustrating an example when the tester feature does not engage the indicator feature, in accordance with some embodiments.

Tester 220 may comprise tester feature 224 for engaging indicator feature 244 of indicator 240 when current configuration 250 of indicator 240 is in the configuration corresponding to processing portion 210 as described above. When current configuration 250 in different than the configuration corresponding to processing portion 210, tester feature 224 may not engage indicator feature 244. For example, tester 220 may comprise a pin movable in the direction parallel to center axis 221 of tester 220 as, for example, shown in FIGS. 4A-4B. Indicator feature 244 may comprise an opening extending in the same direction. When current configuration 250 of indicator 240 is in the configuration corresponding to processing portion 210, the pin may protrude into the opening thereby indicating that current configuration is correct for processing using existing processing portion 210. In some embodiments, tester 220 comprises a switch coupled to pin.

In some embodiments, tester feature 224 is rotatable about center axis 221 of tester 220. For example, tester 220 may comprise drive 228 for rotating tester feature 224 about center axis 221 of tester 220. Drive 228 may be controlled by output from processing portion 210. In some embodiments, drive 228, processing portion 210, and tester 220 may be coupled to controller 202 as, for example, shown in FIG. 2A. The operation of controller 202 is described above with reference to FIG. 1.

In some embodiments, tester 220 is a RFID reader-writer as, for example, shown in FIG. 3C and briefly described above. In these embodiments, indicator 240 is a rewritable RFID tag and may include memory 244'. Current configuration 250 of indicator 240 may be encoded in this RFID tag and may be changed (operation 154 in FIG. 1) when current configuration 250 changes (operation 150 in FIG. 1).

In some embodiments, apparatus 200 also comprises aligning portion 230 and indicator 240 supported by aligning portion 230 as, for example, shown in FIG. 2A. Aligning portion 230 may be coupled to different processing portions 210 of apparatus 200. When coupled to processing portion, aligning portion 230 may control orientation of processing portion 210 relative to the processing location on part 290, for example, when apparatus 200 is in use.

Indicator 240 may be rotatable around center axis 241 of indicator 240 with respect to aligning portion 230. In these embodiments, current configuration 250 of indicator 240 is determined based on an angular position of indicator 240. In some embodiments, indicator 240 comprises spring 246 retaining indicator 240 relative to aligning portion 230 as, for example, shown in FIG. 2C. FIG. 2A also illustrates the front-most aligning portion 230 without indicator to illustrate position of spring 246. Spring 246 may also prevent uncontrollable rotation of indicator 240. At same time, spring 246 also allows changing the angular position of indicator 240, for example, when indicator 240 is advanced by tester 220.

In some embodiments, aligning portion 230 comprises coupling component 234 for coupling to processing portion 210. For example, coupling component 234 comprises a set of angled interlocking protrusions disposed about center axis 241 of indicator 240 as, for example, shown in FIG. 2A.

In some embodiments, aligning portion 230 is supported by indexing plate 252. Indexing plate 252 may be also a component of apparatus 200 or may be a separate component. Indexing plate 252 may support one or more additional aligning portions 230 as, for example, shown in FIG. 2A.

Examples of Aircraft and Methods of Fabricating and Operating Aircraft

Figure 7:
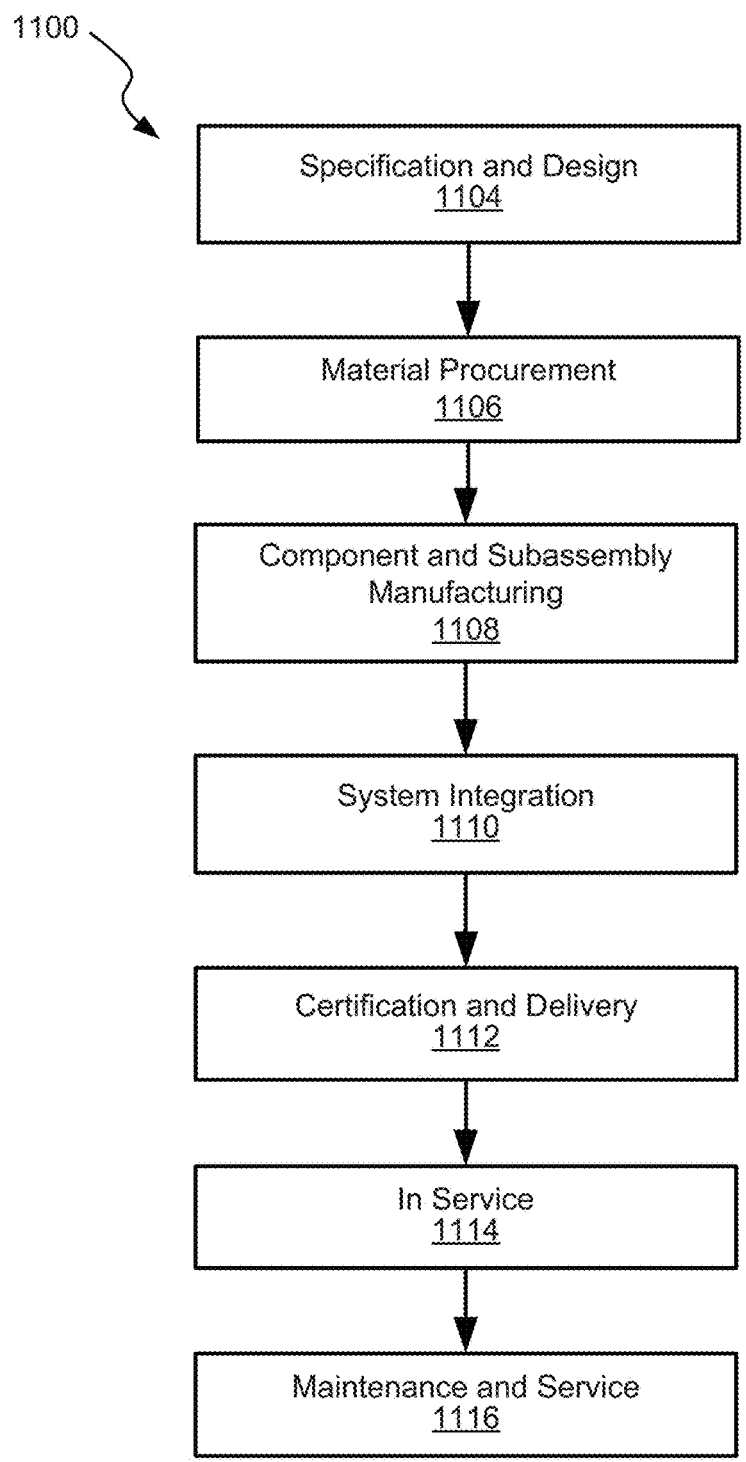
FIG. 7 is a block diagram of aircraft production and service methodology that may utilize methods and assemblies described herein.
Figure 8:
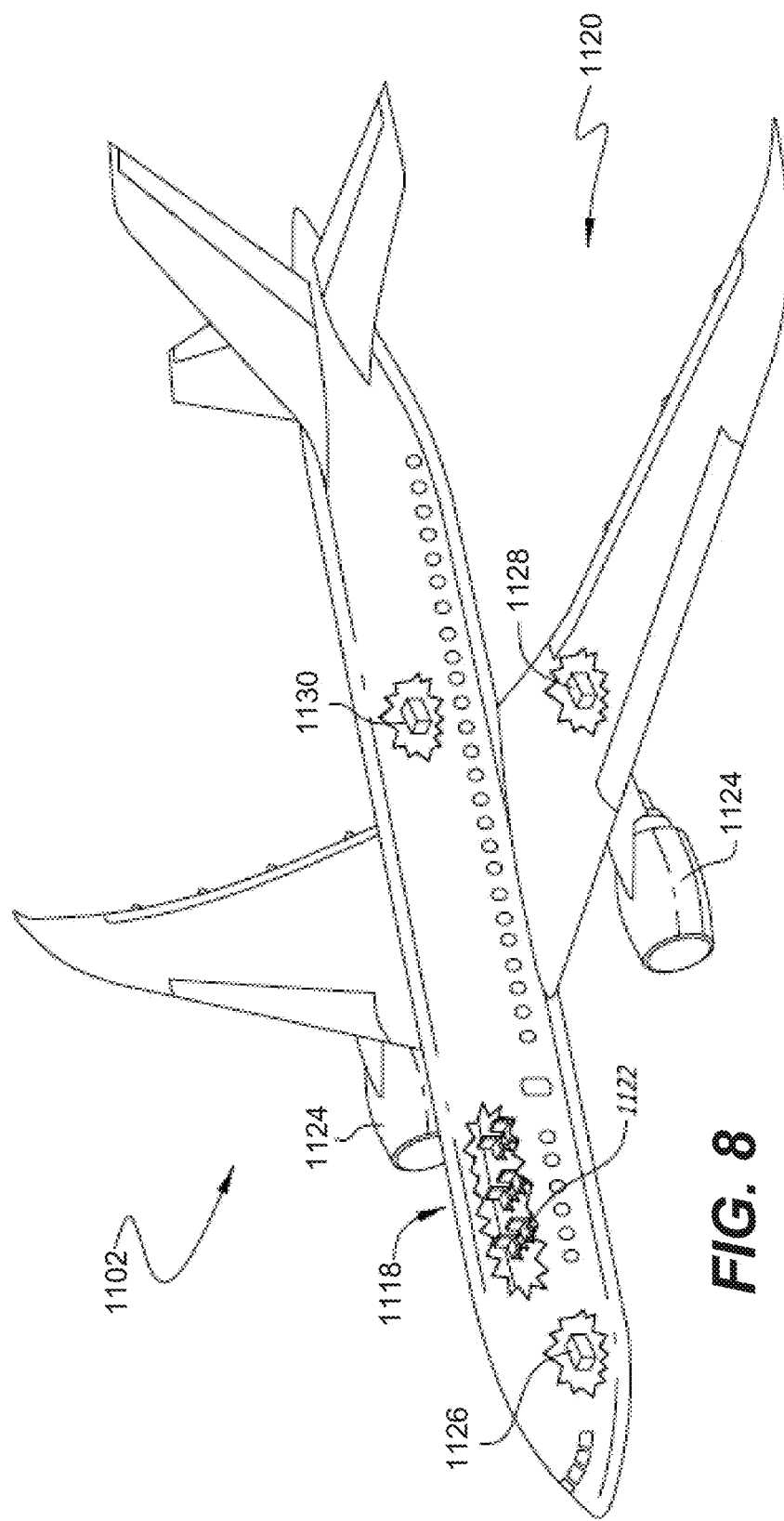
FIG. 8 is a schematic illustration of an aircraft that may include methods and assemblies described herein

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Described methods and apparatuses for processing in accordance with set sequences can be used in any of specification and design (block 1104) of aircraft 1102, material procurement (block 1106), component and subassembly manufacturing (block 1108), and/or inspection system integration (block 1110) of aircraft 1102.

Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102. Described methods and assemblies apparatuses for processing in accordance with set sequences ° can be used in any of certification and delivery (block 1112), service (block 1114), and/or routine maintenance and service (block 1116).

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level inspection systems 1120 and interior 1122. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A method comprising:
    attaching an aligning portion to a part;
    coupling a first processing portion to the aligning portion, wherein an indicator of the aligning portion is in a first angular orientation relative to a center axis of the aligning portion;
    determining that a current configuration of the indicator is in a first configuration corresponding to the first angular orientation of the indicator relative to the center axis, wherein the first configuration corresponds to the first processing portion;
    processing the part using the first processing portion after determining that the current configuration of the indicator is in the first configuration;
    after the part has been processed using the first processing portion, changing the current configuration of the indicator from the first configuration to a second configuration corresponding to a second angular orientation of the indicator relative to the center axis of the aligning portion by rotating the indicator about the center axis of the aligning portion, the second configuration corresponding to a second processing portion;
    decoupling the first processing portion from the aligning portion; and
    coupling a second processing portion to the aligning portion.

2. The method of claim 1, further comprising:
    determining that the current configuration of the indicator is in the second configuration; and
    processing the part using the second processing portion after determining that the current configuration of the indicator is in the second configuration.

3. The method of claim 1, further comprising separating the aligning portion from the part.

4. The method of claim 1, wherein determining the current configuration of the indicator is performed while the first processing portion is coupled to the aligning portion.

5. The method of claim 1, wherein determining the current configuration of the indicator is performed using a first tester of the first processing portion and comprises determining a structural position of a first test feature of the first tester after coupling the first processing portion to the aligning portion.

6. The method of claim 5, wherein, if the current configuration is the first configuration, the first test feature of the first tester is in an extended position after coupling the first processing portion to the aligning portion.

7. The method of claim 5, wherein, if the current configuration is the first configuration, the first test feature of the first tester protrudes into an indicator feature of the indicator after coupling the first processing portion to the aligning portion.

8. The method of claim 1, wherein changing the current configuration of the indicator from the first configuration to the second configuration comprises rotating the indicator around the center axis of the indicator by a set angle.

9. The method of claim 8, wherein rotating the indicator around the center axis of the indicator by the set angle is performed while a first test feature of the first processing portion engages an indicator feature of the indicator.

10. The method of claim 9, wherein rotating the indicator around the center axis of the indicator by the set angle comprises rotating the first test feature engaging the indicator feature about the center axis.

11. The method of claim 10, wherein rotating the first test feature about the center axis comprises rotating a first tester supporting the first test feature around the center axis.

12. The method of claim 11, wherein rotating the first tester is performed using a drive supported on the first processing portion.

13. The method of claim 1, wherein processing the part using the first processing portion comprises receiving an output from a first tester of the first processing portion if the first tester determines the current configuration is the first configuration.

14. The method of claim 2, wherein processing the part using the second processing portion is a sequential operation performed after processing the part using the first processing portion.

15. The method of claim 1, wherein the indicator comprises multiple indicator features disposed about the center axis, wherein each of the multiple indicator features independently identifies the current configuration of the indicator.

* * * * *